March 22, 1960

E. BOZOYAN 2,929,336

VALVE STRUCTURE

Filed June 19, 1958

INVENTOR
EDWARD BOZOYAN
BY 
ATTORNEY

March 22, 1960  E. BOZOYAN  2,929,336
VALVE STRUCTURE

Filed June 19, 1958  3 Sheets-Sheet 2

INVENTOR
EDWARD BOZOYAN
BY
ATTORNEY

March 22, 1960  E. BOZOYAN  2,929,336
VALVE STRUCTURE

Filed June 19, 1958  3 Sheets-Sheet 3

INVENTOR
EDWARD BOZOYAN
BY
ATTORNEY

United States Patent Office 2,929,336
Patented Mar. 22, 1960

1

2,929,336

VALVE STRUCTURE

Edward Bozoyan, Union City, N.J.

Application June 19, 1958, Serial No. 743,083

13 Claims. (Cl. 103—234)

This invention relates to intermittent fluid power supply devices, and is particularly, although not exclusively, directed to pumping apparatus for lifting water from deep wells by a gaseous pressure fluid such as air or steam.

Although gaseous pressure fluid devices employing eduction tubes and control valves have heretofore been employed, they are known to have certain disadvantages which render them unsatisfactory for use in certain fields, particularly for large volume discharges from wells which are relatively deep. It is the objective of my invention to provide an effective device in this category adapted continuously to supply gaseous pressure fluids for pumping or other power uses; and I accomplish this objective by employing a novel form of valve structure with a minimum of moving parts, and without the use of reciprocating or rotary types of fluid-supplying apparatus.

It is an important object of my invention to enable it to be employed for the pumping of water from deep wells with no part of the apparatus proper submerged below the level of the water supply of the well, thereby reducing deterioration due to wear and rust. And in this aspect of my invention it is a further object to obviate the need to position control devices at the base of the well, as is required in conventional devices, my invention being adapted for positioning all control mechanisms above the surface of the ground.

In pumping installations connected to deep wells where extremely long movable connections extend from the ground surface to the water level of the well, a common difficulty results from the bending or deflection of such elongated parts, causing friction, breakage and at times ineffective operation. It is another one of my objects to overcome this difficulty by novel self-adjusting means, whereby deflections or deviations of the elongated components due to variations in temperature, pressure, weight, etc. will not interfere with the continuous operation of my apparatus.

It is further within my contemplation to provide a relatively simple and inexpensive apparatus adapted to accomplish the objectives hereinabove mentioned.

Other objects, features and advantages will appear from the drawings and the description hereinafter given.

Referring to the drawings.

2

Figure 1:
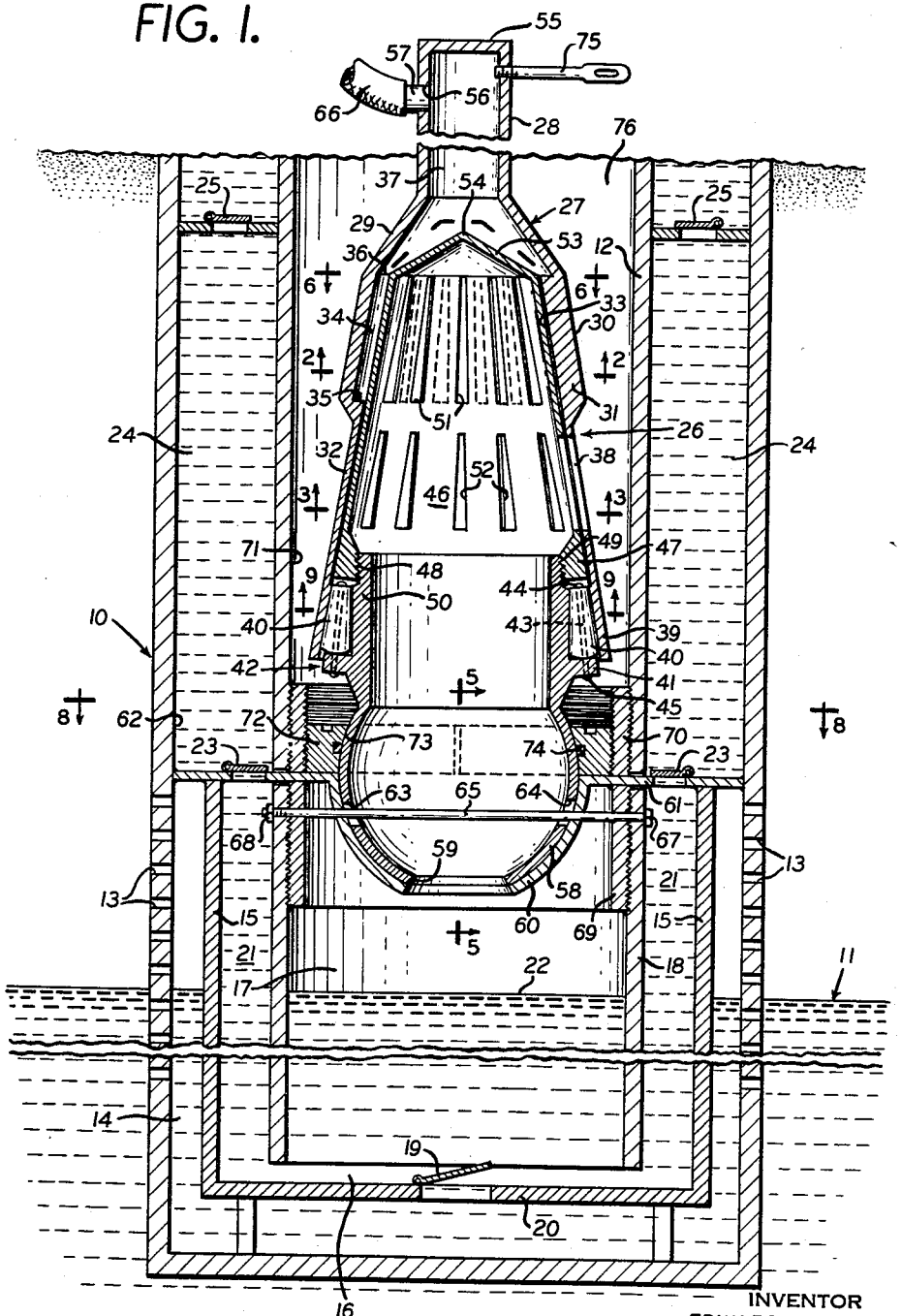
Figure 1 is a vertical sectional view of a form of my invention adapted for deep well pumping purposes, portions being broken away and other parts being semi-schematically illustrated, the parts being shown in the non-pumping portion of the operative cycle.
Figure 1:
Figure 4:
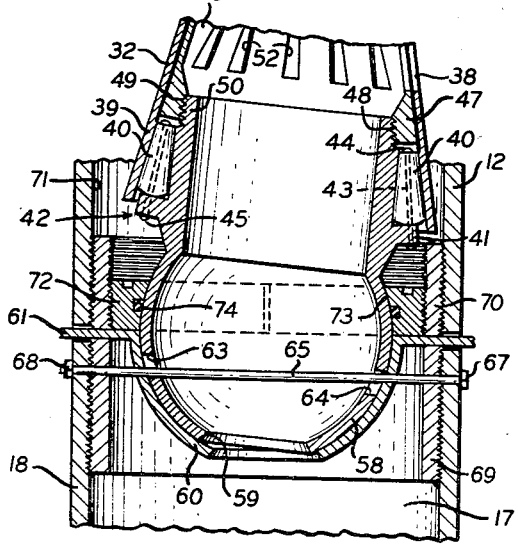

Figure 4 is a fragmentary view of the lower portion of the apparatus of my invention, substantially as shown in Figure 1, but somewhat inclined from the vertical.

Figure 5:
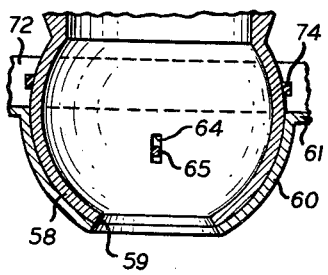

Figure 5 is a fragmentary section of Figure 1 taken substantially along the line 5—5.

Figure 6:
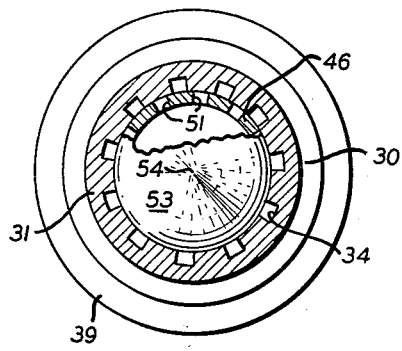

Figure 6 is a section of Figure 1 taken along line 6—6, a fragment being removed for clarity.

Figure 7:
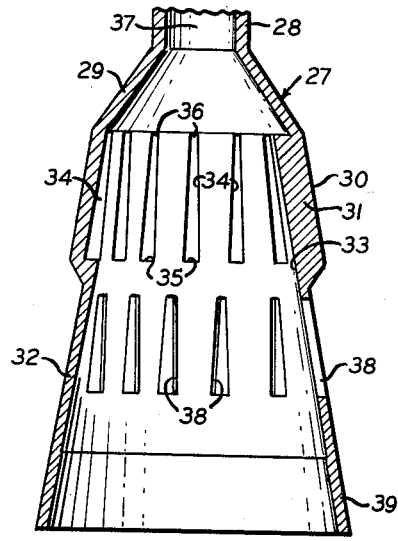

Figure 7 is an axial vertical section of a portion of the outer movable sleeve member of my apparatus.

Figure 8:
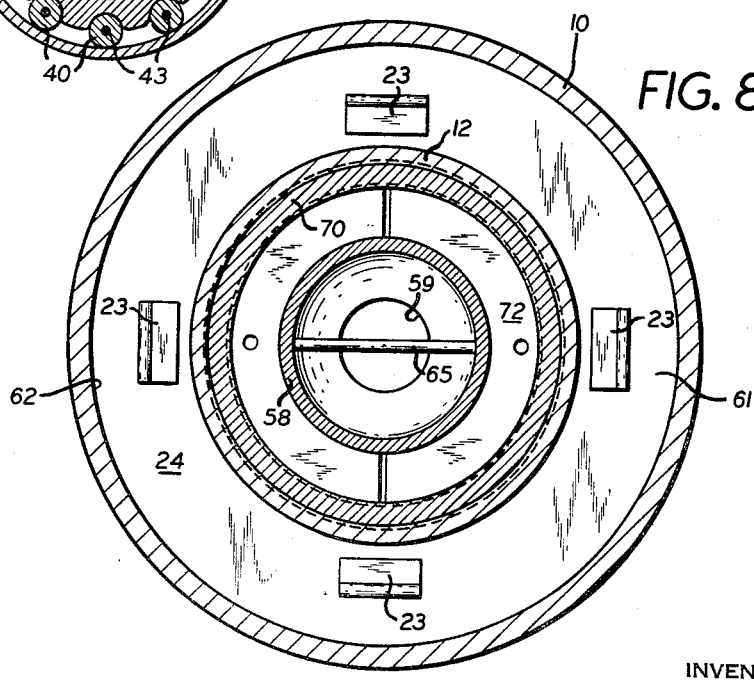

Figure 8 is a section of Figure 1 taken substantially along line 8—8.

Figure 9:
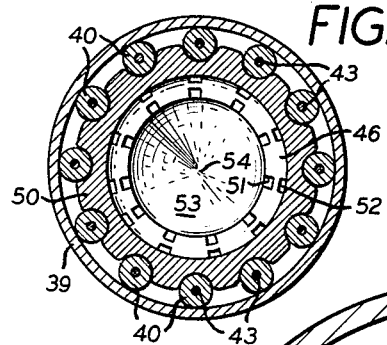

Figure 9 is a section of Figure 1 taken substantially along line 9—9.

In the form of my invention illustrated, a well structure generally designated 10 is partially immersed in the well water generally designated 11 and disposed considerably below the ground surface. Disposed concentrically within the upper portion of well structure 10 is the upper casing 12, said structure 10 containing around the lower portion thereof a plurality of apertures 13. These apertures permit water to enter the intermediate chamber 14 between the outer well wall 62 and the inner wall 15, the water entering the inner chamber 16 and the pressure chamber 17, formed by lower casing 18, through the one-way valve 19 in the base 20 of the said inner chamber. The arrangement is hence such that under normal conditions the level of the water within chamber 17 and the intermediate chamber 14 is the same as the level of the water outside of the well structure 10. By a pumping action which will hereinafter be described, gaseous pressure fluid is forced down against the surface 22 of the water in chamber 17, thereby closing the one-way valve 19, whereby water will move upwardly through side chamber portions 21 up through the one-way valves 23 into the annular chamber 24, between wall 62 and upper casing 12 (see Figs. 1 and 8). Under the continued operative pressure, the water in the annular chamber 24 moves upwardly past the open one way valves 25 to discharge outlets not shown. When the operative cyclic pressure from the pumping apparatus is discontinued, in a manner to be hereinafter described, the reduced pressure in the pressure chamber above the lowered level 22 of the water 11 will permit the valve 19 to open under the pressure of the entering water from therebelow, to return the water to the normal level within pressure chamber 17, in position for the next pumping cycle.

Operatively associated with the well construction above described is the pump valve apparatus generally designated 26, this being the major portion of my invention. This has, as one of its components, the outer sleeve member 27 comprising an upper fluid supply conduit 28 extending above the ground level (not shown), the bottom of said conduit joining the frusto-conical wall 29 which in turn is joined to the generally conical sleeve portion 30, the latter having, in the preferred form illustrated, a relatively heavy annular upper portion 31 and a thinner annular portion 32, both of said portions flaring downwardly and outwardly. Said sleeve portion 30 contains along the upper portion of the inner surface 33 thereof a plurality of circumferentially disposed longitudinally elongated channels 34, these being preferably of trapezoidal configuration and narrower at the top than at the bottom, as shown. Each of these channels is closed at the bottom by a floor 35, and open at the top portion 36, so that the channels communicate with the interior 37 of the said fluid conduit 28. The said channels 34 are equally spaced and of uniform configuration and proportions.

Disposed below the said channels 34 in the relatively thin annular wall 32 of the sleeve portion 30 are a plurality of apertured portions or ports 38, these also being preferably equally spaced, of trapezoidal configuration, and of uniform proportions. The ports 38 are disposed in staggered relation with respect to the channels 34 as is clearly illustrated in Fig. 7. The conical wall 32 of the sleeve portion 30 extends downwardly below the said ports 38, the bottom skirt portion 39 resting upon and being supported by a plurality of circumferentially disposed tapered roller bearings 40. In the particular form illustrated, these bearings are supported by the annular shelf 41 of the base member generally designated 42, to be hereinafter described, each of said rollers 40 having a pin 43 extending axially therethrough, the pin containing an upper head 44 in engagement with the top of the roller and a lower head 45 in engagement with the underside of the shelf 41, in well-known manner. The arrangement is hence such that the entire sleeve member 27 is rotatably supported upon said arrangement of roller bearings, thereby permitting a rotary movement of said sleeve member 27 about a substantially vertical axis.

Disposed within said outer sleeve 27 is a stationary inner sleeve or shell 46, this member being also of generally conical configuration the lateral wall of which is flared to conform with the inner surface of said wall 32 of the outer sleeve. The lower peripheral portion 47 of the inner sleeve 46 is thickened and contains an internally threaded portion 48 in engagement with the upper outwardly threaded portion 49 of the upper shell 50 of the said base member 42. The arrangement is hence such that member 46 is maintained in a predetermined fixed position relative to said supporting base 42.

The annular wall of the sleeve 46 contains a plurality of upper circumferentially disposed longitudinally elongated and preferentially trapezoidal apertured portions or ports 51, and has therebelow another plurality of circumferentially arranged apertured portions or ports 52, of generally the same trapezoidal configuration as the ports 51 and in longitudinal alignment therewith. The said ports 51 are the same in number and proportions as the channels 36 of the outer sleeve 27, and are positioned so as to be, in one operative position of the outer sleeve 27, in registry with said channels 36, and in another position out of registry therewith, as will more clearly hereinafter appear. Similarly, the ports 52 are the same in number and proportions as the ports 38 of the outer sleeve 27, and are positioned so as to be, in one operative position of the outer sleeve 27, in registry with ports 38, and in another position out of registry therewith, as will be hereinafter described.

The top of inner sleeve member 46 is closed by the conical roof 53 the conical wall of which slopes from the apex 54 downwardly and outwardly towards the said channels 34, so as to deflect downwardly moving gases from the conduit 28 towards said channels. The top 55 of said conduit 28 is closed; and the lateral wall thereof contains an aperture 56 and a nipple 57 on which a flexible hose 66 is disposed, so that gaseous fluid from some suitable source, such as a conventional air compressor or steam supply, can be directed through said aperture 56 and into the conduit 28.

The said base member 42 contains at the bottom thereof a generally spherical wall 58 with a bottom orifice 59, said spherical wall 58 resting upon the generally spherical support 60 shown integral with the horizontal plate 61 which contains the said one-way valves 23, said plate extending, in the form illustrated, to the wall 62 of the well structure 10, and being fixedly connected thereto as well as to the wall 15. The arrangement is such that the spherical portion 58 is rotatably supported by the wall 60, the latter acting as a sort of thrust bearing therefor.

At diametrically opposite portions of wall 58 are two vertically elongated apertures 63 and 64, a rod 65 extending therethrough to prevent a rotation of member 42 around a vertical axis, although permitting a slight tilting or rotation about a horizontal axis to a position substantially like that shown in Fig. 4. The outer ends of said rod 65 are supported by the lower casing 18, said rod extending through diametrically opposite apertures therein and being maintained in place by a head 67 and nut 68. The rod also extends through the externally threaded nipple 69 which is secured to the underside of the plate 61, and is in threaded supporting engagement with the said lower casing 18. Another nipple 70, internally and externally threaded, is in threaded engagement with the upper surface 71 of the inner casing 12, and is secured to the upper surface of said plate 61. In engagement with the internally threaded portion of said nipple 70 is a split nut 72 the inner surface 73 of which is curved for engagement with the spherical outer surface of the wall 58, there being a packing ring 74 in frictional engagement with said spherical wall, thereby to prevent a leakage of fluid therepast. This entire arrangement permits of a sturdy and easily assembled and disassembled structure.

Figure 2A:
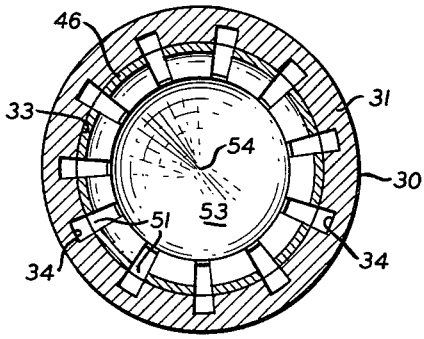
Figure 2A is another section along line 2—2 showing the valve device in the pumping portion of the operative cycle.
Figure 2:
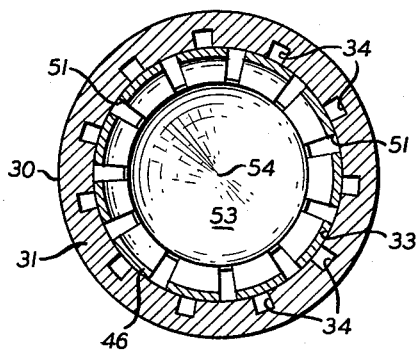
Figure 2 is a somewhat enlarged section of Figure 1 taken along line 2—2.
Figure 3A:
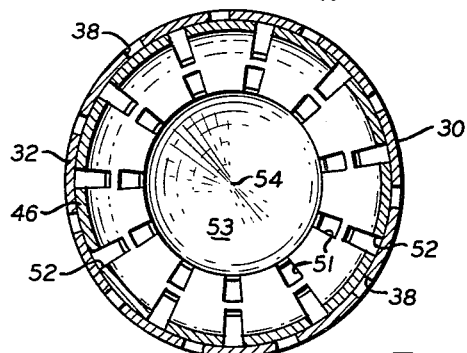
Figure 3A is another section of Figure 1 taken along line 3—3 but showing the valve device in the pumping portion of the operative cycle.
Figure 3:
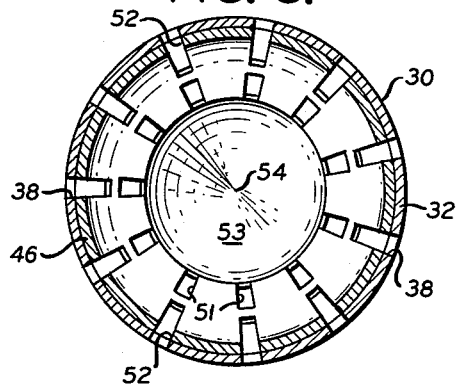
Figure 3 is a somewhat enlarged section of Figure 1 taken along line 3—3.

Affixed to the upper conduit portion 28 of the outer sleeve member 27 is an actuating rod 75 connected, by suitable means not shown, to a reciprocating or oscillating mechanism for effecting a rotation of the sleeve about a vertical axis between two limiting positions. Such reciprocating mechanism is not shown in the drawing, inasmuch as such mechanisms are well-known in the art and a description thereof is not necessary for an understanding of the present invention. Suffice to say that the member 75 is reciprocatingly actuated to cause the aforesaid rotary movement of outer sleeve 27 between limiting positions—the rollers 40, which support the said outer sleeve 27 in the manner aforesaid, permitting an easy operative rotation of said outer sleeve member. The two limiting positions, as determined by the operative reciprocating movements of the actuating member 75, are such as, in one of said limiting positions to cause the ports 51 to be in registry with the channels 34, and the ports 52 to be out of registry with the ports 38, and in the other limiting positions to cause the said ports 51 to be out of registry with the channels 34, and the ports 52 to be in registry with the ports 38. These limiting positions are clearly shown in Figures 2, 2A, 3 and 3A. In Figs. 2 and 3 the inner sleeve's ports 51 are shown out of registry with the outer sleeve's channels 34, and the lower ports 52 of the inner sleeve are shown in registry with the ports 38 of the outer sleeve, the ports thus being positioned for the discharge of the gaseous fluid, in a manner to be hereinafter explained. In Figures 2A and 3A, the inner sleeve's ports 51 are in registry with the outer sleeve's channels 34; and the inner sleeve's ports 52 are out of registry with the outer sleeve's ports 38, the ports thus being positioned for gaseous fluid inlet, as will more clearly hereinafter appear.

In the operation of this device the gaseous fluid, such as air or steam, is introduced under pressure through the flexible pipe 66 and the opening 56 into the fluid supply conduit portion 28 of the outer sleeve 27. The flow of the gas is downward until it reaches the conical top 53 of the inner sleeve, whereupon it is deflected laterally and downwardly towards the channels 34. When the relative positions of the outer and inner sleeves are as indicated in Figs. 2A and 3A, this fluid enters the interior of the inner sleeve through the slots 51, since the channels 34 are in registry therewith; and under the continued pressure the gaseous fluid flows downwardly past the closed ports at 52, into the hollow base member 42 and out through the orifice 59 for engagement with the surface 22 of the body of water within the pressure chamber 17. This gaseous fluid under pressure forces the water, as aforesaid, upwardly through the side chamber portions 21, chamber 24, past the valves 25 and into suitable collecting pipes not shown. When the inner and outer sleeve members are operatively brought into their gas discharge positions, as illustrated in Figs. 1, 2 and 3, the intake ports at 51 are closed, and any gases under pressure within the inner sleeve 46 or the pressure chamber above the surface of the water will flow outwardly through the now open ports at 52 and 38, such discharged gases flowing upwardly through exhaust chamber 76 and outwardly through suitable discharge outlets.

It is thus apparent that by relatively small oscillations of the outer sleeve member 27 between its two limiting positions, there are rapid alternating intake and discharge cycles, causing a substantially continuous pumping action in the manner aforesaid. It is to be noted that since this device is adapted for use with a plurality of inlet and outlet discharge ports, relatively large volumes of gaseous pressure fluid can be supplied, to create large volume pumping actions. This is accomplished without the use of any reciprocating or rotary parts at the depth of the water level, the only movements being the short operative rotary oscillations of the outer sleeve member. The arrangement is hence such as to eliminate the need for costly control mechanisms at the inaccessible depths at which the pumping action must take place; and from this it is apparent that the need for making adjustments or repairs, such as is more or less common with intricate conventional reciprocating or rotary mechanisms, is here reduced to a minimum, or entirely eliminated over long periods of time. All actuating mechanisms can be located above the ground, where repairs and replacements can readily be made. It is further to be noted that no part of the pumping mechanism or valve apparatus 26 is immersed in the water to be pumped, as is the case in conventional types of apparatus; and it is accordingly evident that there is correspondingly reduced deterioration due to wear and rust.

In deep well installations the fluid supply conduit portion 28 of the outer valve member 27 may be of considerable length, with the possible danger that there might be some deflection away from the perpendicular. Due to the spherical support 60 and the spherical wall 58 of the base member 42 supported by said member 60, any such slight deflections will not interfere with the operation of the device. As shown in Fig. 4, the vertically elongated apertures 63 and 64 in the spherical wall 58 permit a slight tilting of the structure, without interfering with the rotary operative oscillation of the outer sleeve 27. Yet, because of the diametral rod 65, the base member 42 is prevented from rotating around a vertical axis, so that it could adequately serve as a supporting base for the inner and outer sleeves.

In the description hereinabove given, the invention has been disclosed merely by way of example and in preferred manner; but obviously many other variations and modifications may be made therein. It is to be understood, therefore, that the invention is not limited to any specific form or manner of practicing same, except insofar as such limitations are specified in the appended claims.

I claim:

1. In a fluid power supply device, a fluid supply conduit, an outer sleeve member, an inner sleeve member disposed within said outer sleeve member, one of said members being movable relative to the other member between two limiting positions, the lateral wall of said outer sleeve member having along an upper portion thereof a plurality of internally open channels and along a lower portion thereof a plurality of ports, the lateral wall of said inner sleeve member having along an upper portion thereof a plurality of upper ports and along a lower portion thereof a plurality of lower ports, said upper ports of the inner sleeve member being in registry with said channels and said lower ports of the inner sleeve member being out of registry with the lower ports of said outer sleeve member when said movable member is in one of its said limiting positions, said upper ports of the inner sleeve member being out of registry with said channels and said lower ports of the inner sleeve member being in registry with the lower ports of said outer sleeve member when said movable member is in the other of its said limiting positions, said fluid supply conduit being in communication with said channels of said outer sleeve member, fluid supply means communicating with said conduit, a base member operatively supporting said sleeve members, said base member having at the bottom thereof a generally spherical wall, an orifice in said spherical wall, supporting means for said spherical wall to permit a rotational movement thereof thereby permitting a tilting of said base member and the sleeve members supported thereby, a pressure chamber communicating with the interior of said base member through said orifice, and an exhaust chamber outside of said sleeve members and communicating with the interior of said inner sleeve member through the lower ports of said respective sleeve members when the ports are in registry.

2. In a fluid power supply device, a fluid supply conduit, a substantially frustro-conical outer sleeve member, a substantially frustro-conical inner sleeve member disposed within said outer sleeve member, said members being in vertical axial alignment, one of said members being rotatable about its vertical axis relative to the other member between two limiting positions, the lateral wall of said outer sleeve having along an upper portion thereof a plurality of internally open channels and along a lower portion thereof a plurality of ports, the lateral wall of said inner sleeve members having along an upper portion thereof a plurality of upper ports and along a lower portion thereof a plurality of lower ports, said upper ports of the inner sleeve member being in registry with said channels and said lower ports of the inner sleeve member being out of registry with the lower ports of said outer sleeve member when said movable member is in one of its said limiting positions, said upper ports of the inner sleeve member being out of registry with said channels and said lower ports of the inner sleeve member being in registry with the lower ports of said outer sleeve member when said movable member is in the other of its said limiting positions, said fluid supply conduit being in communication with said channels of said outer sleeve member, fluid supply means communicating with said conduit, a base member, roller bearing means operatively supported by said base member, said roller bearing means being in supporting engagement with the lower portion of said movable sleeve member, said base member having at the bottom thereof a generally spherical wall, an orifice in said spherical wall, supporting means for said spherical wall to permit a rotational movement thereof thereby permitting a tilting of said base member and the sleeve members supported thereby, a pressure chamber communicating with the interior of said base member through said orifice, and an exhaust chamber outside of said sleeve members and communicating with the interior of said inner sleeve member through the lower ports of said respective sleeve members when the ports are in registry.

3. In a fluid power supply device, the combination according to claim 2, said base member having a peripheral shelf thereabout, said movable sleeve member extending substantially to the region of said shelf, said roller bearing means being supported by said shelf and being in engagement with the inner surface of said movable sleeve member.

4. In a fluid power supply device, the combination according to claim 2, the upper portion of said base member being hollow and of substantially cylindrical configuration, the top portion of said base member being threaded, the bottom of said stationary sleeve member being in threaded engagement with said threaded top portion of the base member.

5. In a fluid power supply device, a vertical elongated fluid supply conduit, a pair of cooperating sleeve valve members with coactively positioned inlet and outlet openings, an exhaust chamber positioned for communication with said outlet openings, said conduit being connected to one of said sleeve valve members and positioned for communication with said inlet openings, a base member operatively supporting said sleeve members, said base member having at the bottom thereof a generally spherical wall, an orifice in said spherical wall, supporting means for said spherical wall to permit a rotational movement thereof thereby permitting a tilting of said base member and the sleeve members supported thereby, and a pressure chamber communicating with the interior of said base member through said orifice.

6. In a fluid power supply device, the combination according to claim 5, said base member having a hollow body portion communicating with said outlet openings of said pair of sleeve valve members, and means to hold said base member against rotary movement about a vertical axis.

7. In a fluid power supply device, the combination according to claim 5, said base member having a hollow body portion communicating with said outlet openings of said pair of sleeve valve members, said supporting means for said spherical wall having a concave seat upon which said spherical wall rests, a pair of diametrically opposite vertically elongated openings in said spherical wall, and a substantially horizontal rod extending through said seat and said openings, said rod being substantially equal in width to that of said openings but of a height less than that of said openings, thereby permitting a slight tilting of the base member away from the vertical and preventing a rotation of the base member about a horizontal axis.

8. In a fluid power supply device, a vertical elongated fluid supply conduit, a pair of cooperating sleeve valve members with coactively positioned inlet and outlet openings, an exhaust chamber positioned for communication with said outlet openings, said conduit being connected to one of said sleeve valve members and positioned for communication with said inlet openings, a base member operatively supporting said sleeve members, said base member having at the bottom thereof a generally sperical wall, an orifice in said spherical wall, supporting means for said spherical wall to permit a rotational movement thereof thereby permitting a tilting of said base member and the sleeve members supported thereby, a pressure chamber communicating with the interior of said base member through said orfiice, an internally threaded casing surrounding and spaced from said base member, a split nut in threaded engagement with said casing and having an inner portion in embracing engagement with said spherical wall.

9. In a fluid power supply device, the combination according to claim 8, said support having extending therefrom a horizontal plate, an externally threaded nipple suspended from the underside of said plate, and a casing in threaded engagement with and supported by said nipple, said casing defining said pressure chamber.

10. In a fluid power supply device, an elongated vertical fluid supply conduit, a frustro-conical outer sleeve member, a frustro-conical inner sleeve member disposed within said outer sleeve member, said members being in vertical axial alignment, said outer sleeve member being rotatable about its vertical axis between two limiting positions, the lateral wall of said outer sleeve member having along an upper portion thereof a plurality of internally open channels and along a lower portion thereof a plurality of ports, the lateral wall of said inner sleeve member having along an upper portion thereof a plurality of upper ports and along a lower portion thereof a plurality of lower ports, said upper ports of the inner sleeve member being in registry with said channels and said lower ports of the inner sleeve member being out of registry with the lower ports of said outer sleeve member when said outer sleeve member is in one of its said limiting positions, said upper ports of the inner sleeve member being out of registry with said channels and said lower ports of the inner sleeve member being in registry with the lower ports of said outer sleeve member when said outer sleeve member is in the other of its said limiting positions, said fluid supply conduit being integral with said outer sleeve member and being in communication with said channels, said inner sleeve member being closed at the top, a base member operatively supporting said sleeve members, and supporting means for said base member to permit a tilting thereof away from the vertical.

11. In a fluid power supply device, the combination according to claim 10, said fluid supply conduit having at the upper portion thereof a fluid inlet opening, and means attached to said conduit for actuating it about a vertical axis, whereby the said outer sleeve member is correspondingly actuated.

12. In a deep well pumping device, a well structure having water outlet ducts, a pressure chamber operatively communicating therewith, water inlet means communicating with said pressure chamber, a valve apparatus above said pressure chamber comprising a pair of cooperating sleeve valve members with coactively positioned inlet and exhaust openings, an outlet chamber positioned for communication with said outlet openings, a vertical elongated fluid supply conduit connected to one of said sleeve valve members and positioned for communication with said inlet openings, a base member operatively supporting said sleeve members, said base member having at the bottom thereof a generally spherical wall, an orifice in said spherical wall and communicating with said pressure chamber, supporting means for said spherical wall to permit a rotational movement thereof thereby permitting a tilting of said base member and the sleeve members supported thereby, fluid supply means communicating with said conduit, and actuating means for one of said sleeve valve members.

13. In a fluid power supply device, a fluid supply conduit, an outer sleeve member, an inner sleeve member disposed within said outer sleeve member, one of said members being movable relative to the other member between two limiting positions, the lateral wall of said outer sleeve member having along an upper portion thereof a plurality of internally open channels and along a lower portion thereof a plurality of ports, the lateral wall of said inner sleeve member having along an upper portion thereof a plurality of upper ports and along a lower portion thereof a plurality of lower ports, said upper ports of the inner sleeve member being in registry with said channels and said lower ports of the inner sleeve member being out of registry with the lower ports of said outer sleeve member when said movable member is in one of its said limiting positions, said upper ports of the inner sleeve member being out of registry with said channels and said lower ports of the inner sleeve member being in registry with the lower ports of said outer sleeve member when said movable member is in the other of its said limiting positions, said fluid supply conduit being in communication with said channels of said outer sleeve member, fluid supply means communicating with said conduit, a pressure chamber communicating with the interior of said inner sleeve member, and an exhaust chamber outside of said sleeve members and communicating with the interior of said inner sleeve member through the lower ports of said respective sleeve members when said lower ports are in registry.

References Cited in the file of this patent

UNITED STATES PATENTS

| | | |
|---|---|---|
| 1,028,121 | Lofton | June 4, 1912 |
| 1,262,665 | Hedges | Apr. 16, 1918 |
| 1,730,051 | Bennett | Oct. 1, 1929 |
| 1,750,719 | Martin | Mar. 18, 1930 |
| 1,750,951 | Beecher | Mar. 18, 1930 |

UNITED STATES PATENT OFFICE

CERTIFICATION OF CORRECTION

Patent No. 2,929,336           March 22, 1960

Edward Bozoyan

It is hereby certified that error appears in the above numbered patent requiring correction and that the said Letters Patent should read as corrected below.

Column 2, line 72, for "this" read -- thin --; column 3, line 21, for "stationary" read -- relatively stationary --; column 3, lines 40 and 42, for "36", each occurrence, read -- 34 --; column 4, line 11, for "upper surface 71 of the inner" read -- inner surface 71 of the upper --; line 40, for "positions" read -- position --; column 6, line 29, for "members" read -- member --; line 70, for "stationary" read -- relatively stationary --; column 7, line 32, for "horizontal" read -- vertical --; lines 41 and 42, for "sperical" read -- spherical --; same column 7, line 47, for "orfiice" read -- orifice --; column 8, line 24, for "exhaust openings, openings, an outlet" read -- outlet openings, an exhaust --.

Signed and sealed this 26th day of September 1961.

(SEAL)
Attest:

ERNEST W. SWIDER           DAVID L. LADD
Attesting Officer           Commissioner of Patents